Jan. 26, 1926.
J. C. BALDWIN
BATTERY TERMINAL
Filed Dec. 26, 1924
1,570,722
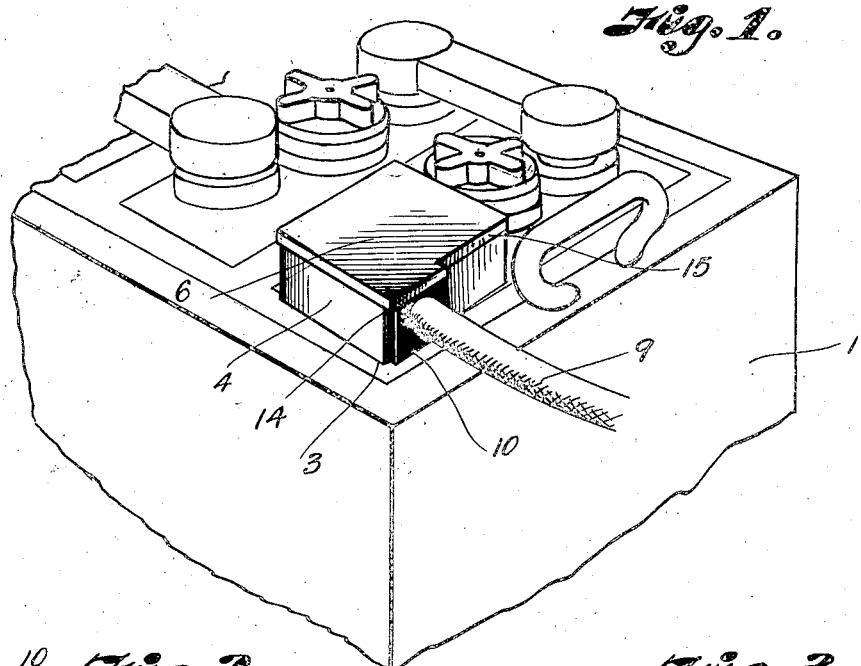
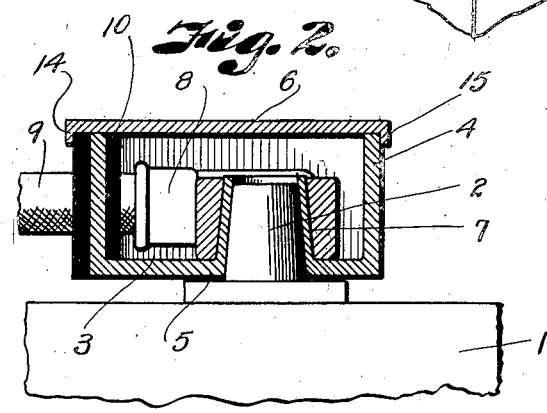
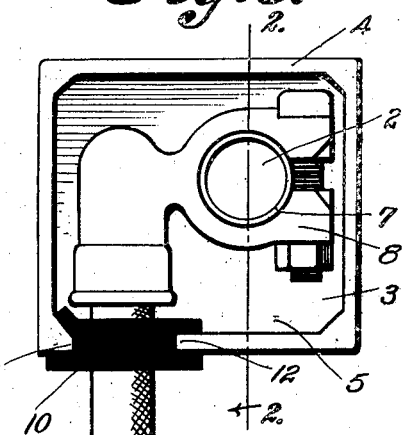
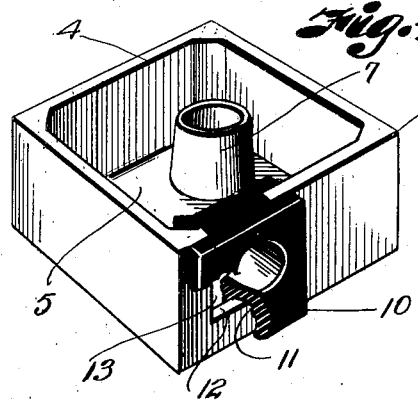
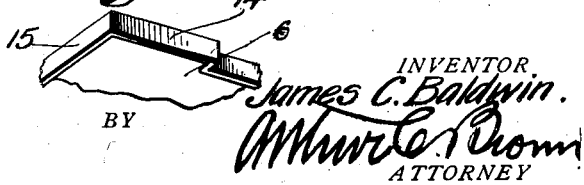
INVENTOR
James C. Baldwin.
BY
Arthur C. Brown
ATTORNEY Patented Jan. 26, 1926.

1,570,722

UNITED STATES PATENT OFFICE.

JAMES C. BALDWIN, OF JUNCTION CITY, KANSAS, ASSIGNOR OF ONE-FOURTH TO W. C. DONNELL AND ONE-FOURTH TO RAY C. SHEETS, BOTH OF NAVARRE, KANSAS, AND ONE-FOURTH TO ELMER B. SAUFLEY, OF KANSAS CITY, MISSOURI.

BATTERY TERMINAL.

Application filed December 26, 1924. Serial No. 757,982.

*To all whom it may concern:*

Be it known that I, JAMES C. BALDWIN, a citizen of the United States, residing at Junction City, in the county of Geary and State of Kansas, have invented certain new and useful Improvements in Battery Terminals; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to secondary battery terminal connections and the primary object thereof is to provide a battery terminal protector which will prevent the electrolyte in the battery from contacting with the terminal and thereby insulating the cable from the battery post due to corrosion.

The clamps for the cables frequently corrode due to the fact that the electrolyte spills out of the cells of the battery and forms a corrosive substance which has poor conductivity, the result being that the cable is insulated from the posts to such an extent that the current flow is opposed; furthermore the corrosive substance freezes the clamp to the battery post so it is difficult to remove. My invention contemplates a protector which will prevent the electrolyte from coming into contact with the terminal or post so that it will remain clean and devoid of the objectional corrosive substance. To this end the invention consists of providing a housing which encloses the terminal and protects the same from deterioration by the elements.

The novel construction of my invention will be apparent by referring to the accompanying drawings, in which—

Fig. 1 is a fragmentary perspective view of a secondary battery to which my invention is applied.

Fig. 2 is a sectional view on line 2:2 of Figure 3.

Fig. 3 is a plan view of the invention.

Fig. 4 is a perspective view of the enclosing housing with the cover removed, and Fig. 5 is a fragmentary perspective view of the cover.

Referring now to the drawings by numerals of reference, 1 designates one end of a secondary battery having a post or terminal 2 of usual construction. Such terminals are usually tapered, that is they are in the form of truncated cones and usually the cable is fastened directly to them. In the present instance however, I provide an enclosing housing 3 having an upstanding wall 4 extending entirely around the edge of the bottom 5, the wall being adapted to receive a cover 6. The bottom plate 5 has an upstanding tubular member 7 which fits over the post or terminal 2. The member 7 receives the clamp 8 of usual construction to which is fastened, in the usual way, the cable 9. The cable extends through an insulation block 10 having a groove 11 on three sides which receive the edge 12 of a block receiving opening 13. The opening 13 is in effect a slot cut in the wall of the housing to receive the block. The block extends outwardly from the wall of the housing due to the fact that the wall is received in a groove in the edge of the block, so the cover 6 is provided with an offset portion or extension 14, the edge of the extension and the edge of the main body portion being provided with a deep cover flange 15 which fits over the edge of the block and over the edge of the housing. It will be apparent that the terminal and the clamp will be entirely enclosed by the housing and its cover so that the electrolyte cannot contact with the terminal and so that the terminal and the clamp will be protected from deterioration by the elements. If desired the housing may be packed with grease or some other suitable material although ordinarily this will not be necessary.

The tubular member is preferably welded to the post 2 thereby providing a solid connection to the post and the acid is prevented from entering the housing from the bottom, consequently the objections heretofore encountered and to which attention has been called in the first part of this description will be eliminated.

What I claim and desire to secure by Letters-Patent is:—

1. A secondary battery connection comprising a housing having an upstanding tubular member carried by its bottom to engage the battery post terminal by fitting over the terminal, the member having an outer face to receive a cable clamp and a removable cover for the housing.

2. A battery terminal connection comprising a housing having a bottom and a side wall extending around the edge of the bottom, the bottom being provided with a tubular member to fit over the battery post terminal and an insulating block carried by the wall of the housing provided with an opening to receive a cable.

3. A battery terminal connection comprising a housing having a bottom and a side wall extending around the edge of the bottom, the bottom being provided with a tubular member to fit over the battery post terminal, an insulating block carried by the wall of the housing provided with an opening to receive a cable and a removable cover carried by the upper edge of the wall of the housing.

4. A battery terminal connection comprising a housing having a bottom and an upstanding wall carried by the bottom, the wall having a slot, an insulating block secured to the edge of the slot and an upstanding tubular member carried by the bottom to fit over the battery post.

5. A battery terminal connection comprising a housing having a bottom and an upstanding wall carried by the bottom, the wall having a slot, an insulating block secured to the edge of the slot, an upstanding tubular member carried by the bottom to fit over the battery post and a cover having a deep ending flange overlapping the housing and the battery post terminal and the block.

In testimony whereof I affix my signature.

JAMES C. BALDWIN.